United States Patent [19]
Kaminsky

[11] Patent Number: 6,023,619
[45] Date of Patent: Feb. 8, 2000

[54] METHOD AND APPARATUS FOR EXCHANGING RF SIGNATURES BETWEEN CELLULAR TELEPHONE SYSTEMS

[75] Inventor: William J. Kaminsky, Walnut Creek, Calif.

[73] Assignee: AirTouch Communications, Inc., San Francisco, Calif.

[21] Appl. No.: 08/751,844

[22] Filed: Nov. 18, 1996

Related U.S. Application Data

[60] Provisional application No. 60/009,864, Dec. 22, 1995.

[51] Int. Cl.[7] .................................................... H04Q 7/22
[52] U.S. Cl. .......................................... 455/411; 455/432
[58] Field of Search .................................. 455/410, 411, 455/432, 433

[56] References Cited

U.S. PATENT DOCUMENTS

| | | | |
|---|---|---|---|
| 4,114,136 | 9/1978 | D'Albora | 367/87 |
| 4,146,892 | 3/1979 | Overman et al. | 342/20 |
| 4,189,677 | 2/1980 | Cooper et al. | 375/316 |
| 4,263,595 | 4/1981 | Vogel | 342/44 |
| 4,264,782 | 4/1981 | Konheim | 380/25 |
| 4,626,845 | 12/1986 | Ley | 340/825.48 |
| 4,775,999 | 10/1988 | Williams | 455/435 |
| 4,843,562 | 6/1989 | Kenyon et al. | 702/73 |
| 5,005,210 | 4/1991 | Ferrell | 455/115 |
| 5,019,961 | 5/1991 | Addesso et al. | 364/192 |
| 5,091,942 | 2/1992 | Dent | 380/46 |
| 5,144,642 | 9/1992 | Weinberg et al. | 375/228 |
| 5,237,612 | 8/1993 | Raith | 380/23 |
| 5,239,294 | 8/1993 | Flanders et al. | 340/825.34 |
| 5,241,598 | 8/1993 | Raith | 380/21 |
| 5,249,230 | 9/1993 | Mihm, Jr. | 380/23 |
| 5,329,591 | 7/1994 | Magrill | 380/25 |
| 5,335,278 | 8/1994 | Matchett et al. | 455/410 |
| 5,375,244 | 12/1994 | McNair | 395/726 |
| 5,420,910 | 5/1995 | Rudokas et al. | 455/410 |

*Primary Examiner*—Andrew M. Dolinar
*Attorney, Agent, or Firm*—Gates & Cooper

[57] ABSTRACT

A method for reducing roaming fraud in mobile phone systems includes the exchange of an RF signature of a roaming mobile phone between the foreign and home service areas. Thereafter, the analysis of the RF signature can be performed either at the foreign or home service area.

46 Claims, 2 Drawing Sheets

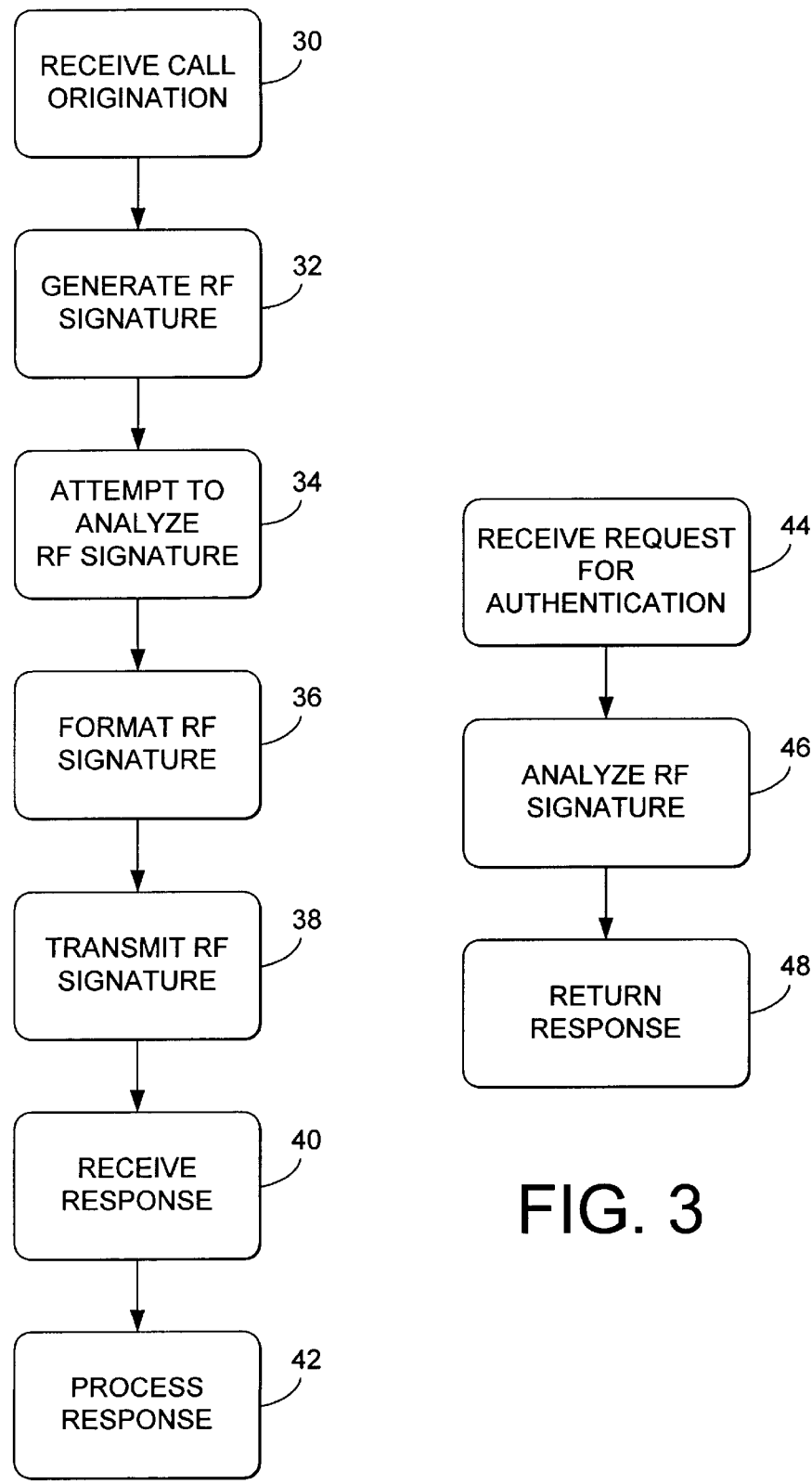

6,023,619

METHOD AND APPARATUS FOR EXCHANGING RF SIGNATURES BETWEEN CELLULAR TELEPHONE SYSTEMS

CROSS-REFERENCE TO RELATED APPLICATIONS

This patent application claims the benefit under 35 U.S.C. § 119(e) of commonly assigned and co-pending provisional patent application Ser. No. 60/009,864, filed Dec. 22, 1995, by William J. Kaminsky, and entitled "METHOD AND APPARATUS FOR EXCHANGING RF SIGNATURES BETWEEN CELLULAR TELEPHONE SYSTEMS", which application is incorporated by reference herein.

This patent application is also related to the following commonly assigned patents and patent applications:

Ser. No. 08/084,367, filed Jun. 29, 1993, by Ronald S. Rudokas, et al., entitled "METHOD AND APPARATUS FOR FRAUD CONTROL IN CELLULAR TELEPHONE SYSTEMS UTILIZING RF SIGNATURE COMPARISON", now U.S. Pat. No. 5,420,910, issued May 30, 1995, Ser. No. 08/389,348, filed Feb. 16, 1995, by Ronald S. Rudokas, et al., entitled "METHOD AND APPARATUS FOR FRAUD CONTROL IN CELLULAR TELEPHONE SYSTEMS", now U.S. Pat. No. 5,555,551, issued Sep. 10, 1996, which is a continuation of patent application Ser. No. 08/084,367 above, Ser. No. 08/657,974, filed May 30, 1996, by Ronald S. Rudokas, et al., entitled "METHOD AND APPARATUS FOR FRAUD CONTROL IN CELLULAR TELEPHONE SYSTEMS", which is a continuation of Ser. No. 08/389,348 above, and Ser. No. 08/633,406, filed Jun. 10, 1996, by William J. Kaminsky, et al., entitled "METHOD AND APPARATUS FOR FRAUD CONTROL IN CELLULAR TELEPHONE SYSTEMS", which is a continuation-in-part of Ser. No. 08/389,348 above, all of which are incorporated by reference herein.

BACKGROUND OF THE INVENTION

1. Field of the Invention.

This invention relates in general to a method of preventing mobile phone fraud, and more specifically, to a method of preventing mobile phone fraud using an exchange of radio frequency signatures between mobile phone systems.

2. Description of Related Art.

Mobile phones combine the mobility of the radio link and the world-wide land telephone network to provide a communication link to any other telephone in the world. However, as mobile phones have become more prevalent throughout the country, fraud has become a major problem. Fraud robs service providers of hundreds of millions of dollars every year. Like all crimes, there are several varieties of fraud, including "cloning."

Cloning fraud, which occurs when a legitimate subscriber's mobile identification number/electronic serial number (MIN/ESN) combination is used for illegal purposes, is among the most sophisticated and difficult forms of fraud to prevent. Often, the pirate will use simple electronic devices to "capture" the legitimate MIN/ESN combination during its transmission by radio frequency (RF). In these cases, the legitimate subscriber often does not know fraud is being commited with his or her MIN/ESN combination until they receive their bill. This is currently the most popular method of gaining illegal access to a mobile phone system, because the legitimacy of the stolen MIN/ESN combinations makes cloning difficult to catch.

Often, cloning fraud occurs outside of the home area of the subscriber. Once the MIN/ESN information has been cloned, the MIN/ESN combination is valid for access to the mobile phone system anywhere. Roamer fraud is committed by a local thief using a MIN/ESN imported from another service area, and thus not representing a true roaming subscriber. The exploited MIN/ESN is usually gathered through the use of a MIN/ESN reader in a home service area for the mobile phone.

It can be seen, then, that there is a need for more effective techniques for preventing mobile phone fraud, especially roaming mobile phone fraud. Furthermore, such techniques must be easy and inexpensive to implement, and must not put unacceptable demands on subscribers.

SUMMARY OF THE INVENTION

To overcome the limitations in the prior art described above, and to overcome other limitations that will become apparent upon reading and understanding the present specification, the present invention discloses a powerful and highly productive method for reducing mobile phone fraud, and more specifically roaming fraud. The present invention solves the above-described problems by exchanging an RF signature of a roaming mobile phone between the foreign and home service areas. Thereafter, the analysis of the RF signature can be performed either at the foreign or home service area.

One object of the present invention is to reduce mobile phone fraud. It is a further object of the invention to reduce roaming fraud. It is a further object of the invention to make it more cost effective to use mobile phone systems.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 is a flowchart illustrating the steps performed by the fraud control system in the foreign service area according to the present invention; and FIG. 3 is a flowchart illustrating the steps performed by the fraud control system in the home service area according to the present invention.

DETAILED DESCRIPTION OF THE INVENTION

Figure 1:
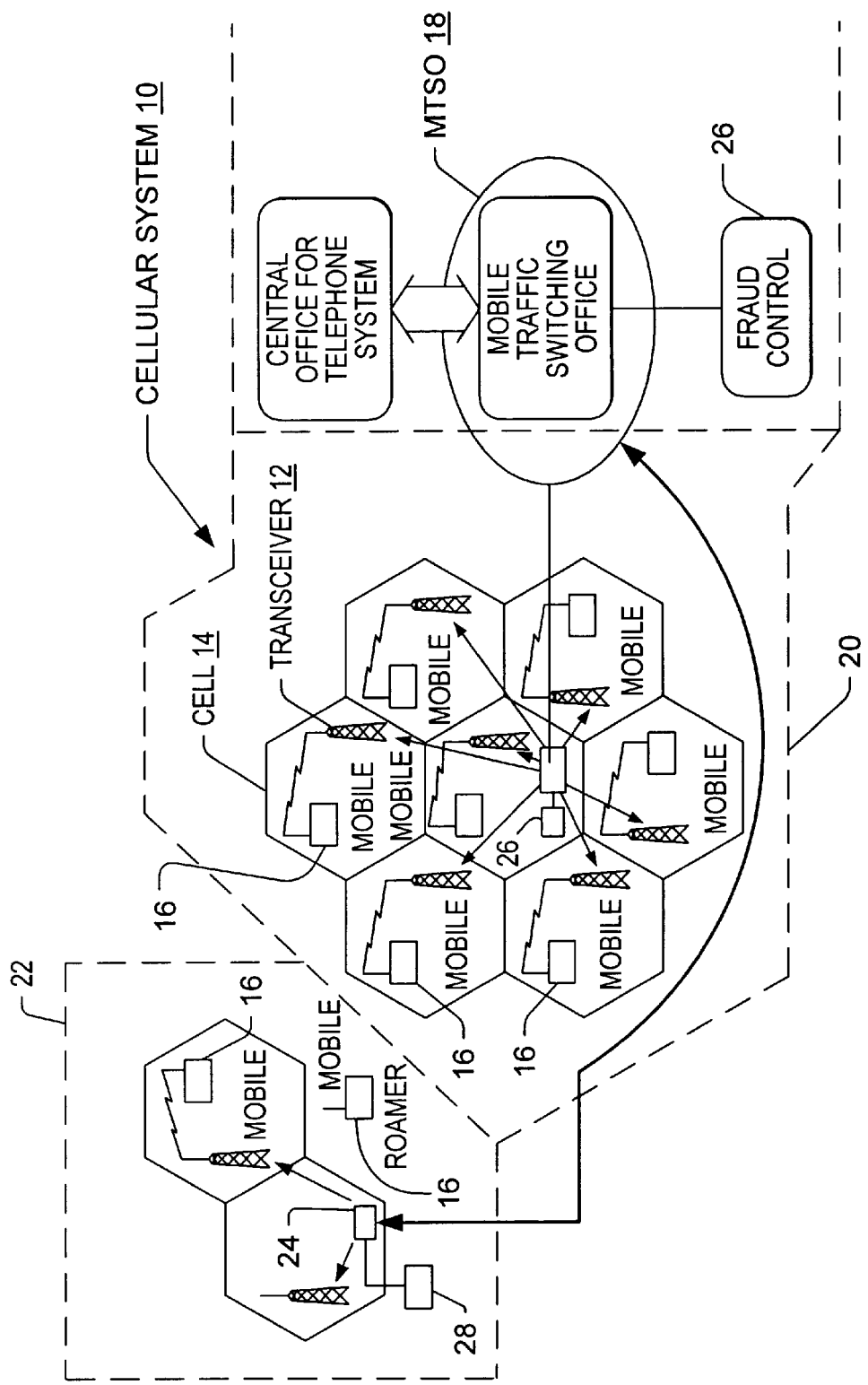
FIG. 1 is a block diagram of an exemplary embodiment of the mobile phone system according to the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

FIG. 1 is a diagram of a typical mobile phone system 10. The basic concept of the mobile phone system 10 is to increase the availability of mobile phone service, which always has been a scarce luxury, by reducing the area covered by a transceiver 12 by reducing the power of transmission. In this way, concentrated areas of population can have more transceivers 12, and thus more channels, because each transceiver 12 handles a given number of conversations. In addition, because the transceivers 12 cover less area, the same frequency can be re-used in a common geographical area.

Within a mobile phone system 10, a service area is divided into regions called cells 14, each of which has the necessary equipment to switch, transmit, and receive calls to and from any mobile phone 16 located in the cell. A transceiver 12 in each cell 14 can transmit and receive on a plurality of FM channels in a specified frequency range simultaneously.

When a user first turns on his mobile phone 16, the mobile phone 16 scans and identifies the set-up or control channels being received. The mobile phone 16 then selects and tunes to the strongest control channel signal in the cell 14, presumably from the nearest cell transceiver 12. Transmitter "busy-idle" bits inform the mobile phone 16 of the status of the reverse signalling portion (mobile phone 16 to cell transceiver 12) of the control channel to prevent simultaneous seizure by more than one mobile phone 16. There are other handshake and timing checks to guard against collisions between mobile phones 16.

Each cell 14 has at least one setup channel dedicated to signaling between the cell 14 and mobile phones 16 within the cell 14. The remaining channels are used for conversation. Each channel may be re-used between cells 14, so long as the re-use factor avoids interference by allowing channel re-use in cells 14 that are not adjacent to one another, and are far enough apart to avoid excessive interference. Thus, a system 10 with a relatively small number of subscribers can use large cells 14, and as demand grows, the cells 14 are divided into smaller ones.

A mobile phone 16 consists of a control unit, a transceiver, and appropriate antennas. The transceiver contains circuits that can tune to any of the channels assigned to the mobile phone system 10. Each mobile phone 16 has a unique electronic serial number (ESN). Additionally, each mobile phone 16 is assigned a 10-digit telephone number, known as a mobile identification number (MIN). Further, mobile phones 16 have unique radio frequency (RF) signatures because of the minute differences in the electronics used to build mobile phones 16.

The mobile phone 16 automatically registers with the mobile phone system 10 when it is powered on. At registration, the mobile phone 16 sends its MIN/ESN, station class mark, etc. to the cell transceiver 12.

Cells 14 are interconnected and controlled by a central Mobile Telecommunications Switching Office (MTSO) 18, which is basically a telephone switching office as far as hardware is concerned, but includes a substantial amount of additional equipment for mobile phone control. The MTSO 18 not only connects the system 10 to the land telephone network, but also records call information for billing purposes.

The mobile phone system 10 of FIG. 1 is made up of a plurality of service areas 20 and 22 that may (or may not) be operated by different mobile phone service providers or carriers. Generally, each of the different service areas 20 and 22 is controlled by a corresponding local MTSO 18 and 24 respectively, and each of the service areas 20 and 22 is identified by a System Identification Number (SID). All mobile phones 16 store an SID entry in their memory that identifies the "home" service area for the mobile phone 16. For example, as a mobile phone 16 travels from its "home" service area 20 to another service area 22, the "foreign" service area 22 provides the mobile phone services to the mobile phone 16, which is then known as a "roamer" in the foreign service area 22.

Generally, agreements between service providers allow for unrestricted roaming by their respective subscribers. Charges incurred by the roamer are transmitted back to the "home" service provider, which pays the "foreign" service provider and then, in turn, bills the subscriber. Of course, if the roamer is fraudulent, the "home" service provider cannot charge the subscriber and thus must absorb the loss itself. The losses from roaming fraud are estimated to be in the tens of millions of dollars each year. The fact that roamer fraud causes the "home" service provider to lose money, rather than just providing free service, is a powerful impetus behind the development of the present invention.

When mobile phone 16 roams from its home service area 20 to the foreign service area 22, the SID and MIN will identify the mobile phone 16 as a roaming phone. When mobile phone 16 places a service registration with the transceiver 12 in service area 22, MTSO 24 is notified that a roaming mobile phone 16 is attempting to place a call.

The MTSO 24 then searches for an RF signature associated with that particular mobile phone 16 in an associated fraud control system 28. Generally, this fraud control system 28 is a computerized system similar to those described in U.S. Pat. No. 5,420,910, U.S. Pat. No. 5,555,551, patent application Ser. No. 08/657,974, and/or patent application Ser. No. 08/633,406, cited in the Cross-Reference above, all of which are incorporated by reference herein.

If there is no RF signature on file in the fraud control system 28, an RF signature is then generated for the roaming mobile phone 16, using one of the techniques described in U.S. Pat. No. 5,420,910, U.S. Pat. No. 5,555,551, patent application Ser. No. 08/657,974, and/or patent application Ser. No. 08/633,406, cited in the Cross-Reference above, all of which are incorporated by reference herein. The present invention then verifies the RF signature of the roaming mobile phone 16 via the exchange of information with the home service area 20.

RF Signature Analysis Performed at the Fraud Control System in the Home Service Area If there is no RF signature on file at the fraud control system 28 of the foreign service area 22, the RF signature of the roaming mobile phone 16 can be transmitted back to the fraud control system 26 of the home service area 20 for analysis. The RF signature can be sent in a "raw" format without any conversion, or can be converted to an interchange format, and thereafter is stored within a digital message for transmission between the MTSO 24 and the MTSO 18.

Once the digital message is received by the MTSO 18, the RF signature portion of the message is passed to the fraud control system 26 of the home service area 20 connected to the MTSO 18. The fraud control system 26 performs an analysis on the received RF signature and the RF signatures kept on file by the fraud control system 26, in order to identify the received RF signature as an authentic subscriber or a fraudulent user. Thereafter, a response is returned to the foreign service area 22, indicating that the RF signature was identified as authentic subscriber or a fraudulent user or could not be identified as either.

If the RF signature is identified as fraudulent (and possibly if the RF signature could not be identified as either authentic or fraudulent), the MTSO 24 will probably deny the call attempt by the roaming mobile phone 16 or require additional authentication by the roaming mobile phone 16.

RF Signature Analysis Performed at the Fraud Control System in the Foreign Service Area An alternative embodiment is to have the fraud control system 28 in the foreign service area 22 perform the RF signature analysis. In this instance, if there is no RF signature on file at the fraud control system 28 of the foreign service area 22, the RF signature and/or MIN/ESN of the roaming mobile phone 16 can be transmitted back to the home service area 20. In response, the fraud control system 26 of the home service area 20 returns one or more RF signatures kept on file by the fraud control system 26. Thereafter, the fraud control system 28 of the foreign service area 22 performs the RF signature analysis.

Retaining the Roaming Mobile phone's RF Signature On File at the Fraud Control System in the Foreign Service Area In both embodiment described above, once the roaming mobile phone 16 has been identified as an authentic subscriber or a fraudulent user, its RF signature may stored for some period of time on the fraud control system 28 in the foreign service area 22. This allows the RF signature to be used for subsequent validations of call attempts by the roaming mobile phone 16, without the need for the exchange of RF signatures with the fraud control system 26 of the home service area 20.

Implementation

FIG. 2 is a flowchart illustrating the steps performed in the foreign service area 22 according to the present invention.

Block 30 represents the MTSO 24 in the foreign service area 22 receiving a call origination or other call event (e.g., registration or page response) for a roaming mobile phone 16.

Block 32 represents the fraud control system 28 in the foreign service area 22 generating an RF signature for the roaming mobile phone 16.

Block 34 represents the fraud control system 28 (optionally) attempting to analyze the RF signature of the roaming mobile phone 16 using RF signatures stored in a database on the fraud control system 28.

Block 36 represents the fraud control system 28 formatting the RF signature of the roaming mobile phone 16 in an interchange format for subsequent transmission to the fraud control system 26 of the home service area 20.

Block 38 represents the fraud control system 28 transmitting a request for authentication, including the RF signature of the roaming mobile phone 16 in the interchange format, to the fraud control system 26 of the home service area 20.

Block 40 represents the fraud control system 28 receiving a response back from the fraud control system 26 of the home service area 20. In a first embodiment, the response may comprise an indication that the RF signature was identified by the fraud control system 26 of the home service area 20 as an authentic subscriber or a fraudulent user or could not be identified as either. In a second embodiment, the response may comprise one or more RF signatures, so that the fraud control system 28 of the foreign service area 22 can perform its own analysis.

Block 42 represents the fraud control system 28 of the foreign service area 22 processing the response to make the appropriate decision regarding the call attempt by the mobile phone 16. This may include authorizing or denying the call attempt by the roaming mobile phone 16, or requiring additional authentication by the roaming mobile phone 16. Further, this may include storing the RF signature of the roaming mobile phone 16 for later use, e.g., in Block 34 for subsequent call attempts.

FIG. 3 is a flowchart illustrating the steps performed in the home service area 20 according to the present invention.

Block 44 represents the fraud control system 26 in the home service area 22 receiving a request for authentication of an RF signature for a roaming mobile phone 16 from the fraud control system 28 in the foreign service area 22. Generally, this request includes the RF signature for the roaming mobile phone 16. The RF signature can be sent in a "raw" format without any conversion, or can be converted to an interchange format.

Block 46 represents the fraud control system 26 in the home service area 20 analyzing the RF signature for the roaming mobile phone 16 using RF signatures stored in a database on the fraud control system 26. This analysis attempts to identify the received RF signature as an authentic subscriber or a fraudulent user.

Block 48 represents the fraud control system 26 in the home service area 20 returning a response to the foreign service area 22, indicating that the RF signature was identified as authentic subscriber or a fraudulent user or could not be identified as either. Further, this may include returning one or more RF signatures for use by the fraud control system 28 of the foreign service area 22.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description.

What is claim is:

1. A method of preventing fraud in mobile telephone systems, comprising the steps of:

receiving a call attempt by a roaming mobile phone;

generating a radio frequency (RF) signature for the roamning mobile phone;

transmitting the RF signature for the roaming mobile phone to a fraud control system in a home service area for the roaming mobile phone;

receiving a response from the fraud control system in the home service area for the roaming mobile phone; and processing the response to make an appropriate decision on the call attempt by the roaming mobile phone.

2. The method of claim 1, further comprising the step of formatting the RF signature of the roaming mobile phone in an interchange format for subsequent transmission to the fraud control system of the home service area.

3. The method of claim 1, further comprising the step of formatting the RF signature of the roaming mobile phone in a raw format for subsequent transmission to the fraud control system of the home service area.

4. The method of claim 1, wherein the response comprises an indication that the RF signature was identified by the fraud control system of the home service area as an authentic subscriber.

5. The method of claim 1, wherein the response comprises an indication that the RF signature was identified by the fraud control system of the home service area as a fraudulent user.

6. The method of claim 1, wherein the response comprises an indication that the RF signature could not be identified by the fraud control system of the home service area as an authentic user or a fraudulent user.

7. The method of claim 1, wherein the response comprises one or more RF signatures, so the fraud control system of the foreign service area can perform its own analysis.

8. The method of claim 1, wherein the processing step further comprises the step of authorizing the call attempt by the roaming mobile phone.

9. The method of claim 1, wherein the processing step further comprises the step of denying the call attempt by the roaming mobile phone.

10. The method of claim 1, wherein the processing step further comprises the step of requiring additional authentication by the roaming mobile phone.

11. The method of claim 1, wherein the processing step further comprises the step of storing the RF signature of the roaming mobile phone for later use.

12. The method of claim 6, further comprising the step of analyzing the RF signature of the roaming mobile phone using the stored RF signature.

13. A method of preventing fraud in mobile telephone systems, comprising the steps of:

receiving a request for authentication at a home service area for a radio frequency (RF) signature of a roaming mobile phone from a fraud control system in a foreign service area;

analyzing the RF signature for the roaming mobile phone using RF signatures stored in a data storage device; and returning a response to the request for authentication.

14. The method of claim 13, wherein the request for authentication comprises the RF signature in an interchange format.

15. The method of claim 13, wherein the request for authentication comprises the RF signature in a raw format.

16. The method of claim 13, wherein the response comprises an authorization for a call attempt of the roaming mobile phone.

17. The method of claim 13, wherein the response comprises a denial for a call attempt of the roaming mobile phone.

18. The method of claim 13, wherein the response comprises a requirement for additional authentication by the roaming mobile phone.

19. The method of claim 13, wherein the response comprises an RF signature for the roaming mobile phone.

20. The method of claim 13, wherein the response comprises an indication that the RF signature was identified as an authentic subscriber.

21. The method of claim 13, wherein the response comprises an indication that the RF signature was identified as a fraudulent user.

22. The method of claim 13, wherein the response comprises an indication that the RF signature could not be identified as an authentic user or a fraudulent user.

23. The method of claim 13, wherein the response comprises one or more RF signatures.

24. A system for preventing fraud in mobile telephone systems, comprising:

a transceiver for receiving a call attempt by a roaming mobile phone;

means for generating a radio frequency (RF) signature for the roaming mobile phone;

means for transmitting the RF signature for the roaming mobile phone to a fraud control system in a home service area for the roaming mobile phone and for receiving a response from the fraud control system in the home service area for the roaming mobile phone; and a processor for processing the response to make an appropriate decision on the call attempt by the roaming mobile phone.

25. The system of claim 24, wherein the RF signature of the roaming mobile phone is formatted in an interchange format for subsequent transmission to the fraud control system of the home service area.

26. The system of claim 24, wherein the RF signature of the roaming mobile phone is formatted in a raw format for subsequent transmission to the fraud control system of the home service area.

27. The system of claim 24, wherein the response comprises an indication that the RF signature was identified by the fraud control system of the home service area as an authentic subscriber.

28. The system of claim 24, wherein the response comprises an indication that the RF signature was identified by the fraud control system of the home service area as a fraudulent user.

29. The system of claim 24, wherein the response comprises an indication that the RF signature could not be identified by the fraud control system of the home service area as an authentic user or a fraudulent user.

30. The system of claim 24, wherein the response comprises one or more RF signatures, so the fraud control system of the foreign service area can perform its own analysis.

31. The system of claim 24, wherein the processor authorizes the call attempt by the roaming mobile phone.

32. The system of claim 24, wherein the processor denies the call attempt by the roaming mobile phone.

33. The system of claim 24, wherein the processor requires additional authentication by the roaming mobile phone.

34. The system of claim 24, wherein the processor stores the RF signature of the roaming mobile phone for later use.

35. The system of claim 29, further comprising means for analyzing the RF signature of the roaming mobile phone using the stored RF signature.

36. A system for preventing fraud in mobile telephone systems, comprising the steps of:

a transceiver for receiving a request for authentication at a home service area for a radio frequency (RF) signature of a roaming mobile phone from a fraud control system in a foreign service area;

an analyzer for analyzing the RF signature for the roaming mobile phone using RF signatures stored in a data storage device; and means for returning a response to the request for authentication.

37. The system of claim 36, wherein the request for authentication comprises the RF signature in an interchange format.

38. The system of claim 36, wherein the request for authentication comprises the RF signature in a raw format.

39. The system of claim 36, wherein the response comprises an authorization for a call attempt of the roaming mobile phone.

40. The system of claim 36, wherein the response comprises a denial for a call attempt of the roaming mobile phone.

41. The system of claim 36, wherein the response comprises a requirement for additional authentication by the roaming mobile phone.

42. The system of claim 36, wherein the response comprises an RF signature for the roaming mobile phone.

43. The system of claim 36, wherein the response comprises an indication that the RF signature was identified as an authentic subscriber.

44. The system of claim 36, wherein the response comprises an indication that the RF signature was identified as a fraudulent user.

45. The system of claim 36, wherein the response comprises an indication that the RF signature could not be identified as an authentic user or a fraudulent user.

46. The system of claim 36, wherein the response comprises one or more RF signatures.

* * * * *

UNITED STATES PATENT AND TRADEMARK OFFICE
CERTIFICATE OF CORRECTION

PATENT NO. : 6,023,619  
DATED : February 8, 2000  
INVENTOR(S) : Kaminsky

Page 1 of 1

It is certified that error appears in the above-identified patent and that said Letters Patent is hereby corrected as shown below:

<u>Column 5,</u>  
Line 19, "embodiment" should read -- embodiments --.  
Line 21, insert -- be -- after "may".

<u>Column 6,</u>  
Line 30, "claim" should read -- claimed --.  
Line 35, "roamning" should read -- roaming --.

Signed and Sealed this

Thirtieth Day of April, 2002

*Attest:*

*Attesting Officer*

JAMES E. ROGAN  
*Director of the United States Patent and Trademark Office*